US012774854B2

(12) United States Patent
Sheelavant et al.

(10) Patent No.: US 12,774,854 B2
(45) Date of Patent: Oct. 27, 2026

(54) HIGH PERFORMANCE HEAT EXCHANGER

(71) Applicant: APPLIED Materials, Inc., Santa Clara, CA (US)

(72) Inventors: Gangadhar Sheelavant, Bangalore (IN); Kyle Hanson, Kalispell, MT (US); Randy A. Harris, Kalispell, MT (US); Prabhugouda Hiregoudra, Bangalore (IN); Karthick Vasu, Bangalore (IN); David Reis, Kalispell, MT (US); Max Kutzman, Santa Clara, CA (US)

(73) Assignee: APPLIED Materials, Inc., Santa Clara, CA (US)

( * ) Notice: Subject to any disclaimer, the term of this patent is extended or adjusted under 35 U.S.C. 154(b) by 91 days.

(21) Appl. No.: 18/764,038

(22) Filed: Jul. 3, 2024

(65) Prior Publication Data

US 2026/0009587 A1 Jan. 8, 2026

(51) Int. Cl.
*F28D 7/16* (2006.01)
*B33Y 80/00* (2015.01)
*C25D 21/02* (2006.01)

(52) U.S. Cl.
CPC ............... *F28D 7/16* (2013.01); *C25D 21/02* (2013.01); *B33Y 80/00* (2014.12)

(58) Field of Classification Search
CPC ............ F28D 7/16; C25D 21/02; B33Y 80/00
USPC .......................................................... 165/154
See application file for complete search history.

(56) References Cited

U.S. PATENT DOCUMENTS 7,905,275 B2 * 3/2011 Behrens ................. H05K 7/205 165/80.4
10,208,714 B2 * 2/2019 Nitta ....................... F28F 1/006
10,704,841 B2 * 7/2020 Manzo .................. B22F 3/1115
10,890,381 B2 * 1/2021 Turney .................... F28D 1/047
10,955,200 B2 * 3/2021 Sabo ......................... F28F 7/02
11,156,241 B2 * 10/2021 Eilers .................... F15B 21/008
11,181,322 B2 * 11/2021 Koeune ................. F28D 7/0041
11,213,923 B2 * 1/2022 Stewart, Jr. ............. B23P 15/26
11,261,738 B2 * 3/2022 Chakrabarti .............. F01D 5/16
11,320,214 B2 * 5/2022 Degner .................. B33Y 80/00
11,542,852 B2 * 1/2023 Friske ........................ F01P 3/18
11,719,492 B2 * 8/2023 Tholence ............ F28D 15/0233 165/104.11
11,725,881 B2 * 8/2023 Felton ..................... B22F 10/14 165/164

(Continued)

*Primary Examiner* — Claire E Rojohn, III
(74) *Attorney, Agent, or Firm* — CHRISTENSEN O'CONNOR JOHNSON KINDNESS PLLC

(57) ABSTRACT

A heat exchanger including a shell, and a gyroid structure comprising a first plurality of holes forming a first fluid path and a second plurality of holes forming a second fluid path, where the first fluid path and the second fluid path are mutually sealed off, where the first plurality of holes is configured to pass a coolant through the first fluid path of the heat exchanger, and where the second plurality of holes is configured to pass a plating chemistry fluid through the second fluid path of the heat exchanger. Further, a method of exchanging heat in the electroplating apparatus including passing the coolant through the first plurality of holes of the first fluid path from the coolant inlet to the coolant outlet and passing the plating chemistry fluid through the second plurality of holes of the second fluid path from the plating inlet to the plating outlet.

16 Claims, 7 Drawing Sheets

(56) References Cited

U.S. PATENT DOCUMENTS

| | | | | |
|---|---|---|---|---|
| 11,725,889 | B1 * | 8/2023 | Kustas | B33Y 70/00<br>165/138 |
| 11,802,742 | B2 * | 10/2023 | Fujiwara | B33Y 80/00 |
| 11,808,179 | B2 * | 11/2023 | Vial | F01D 5/187 |
| 11,874,070 | B2 * | 1/2024 | Abu Al-Rub | B33Y 80/00 |
| 11,988,458 | B2 * | 5/2024 | Becene | B33Y 80/00 |
| 11,994,036 | B2 * | 5/2024 | Winkler | F01D 25/04 |
| 12,055,062 | B2 * | 8/2024 | Binek | B22F 10/28 |
| 12,071,217 | B2 * | 8/2024 | Mendoza | B32B 3/12 |
| 12,103,074 | B1 * | 10/2024 | Martin | B33Y 10/00 |
| 12,117,250 | B2 * | 10/2024 | Fujiwara | B22F 5/10 |
| 12,196,497 | B2 * | 1/2025 | Torresin | F28D 15/0266 |
| 12,276,466 | B2 * | 4/2025 | Liu | F28F 13/12 |
| 12,435,932 | B2 * | 10/2025 | Erno | B33Y 10/00 |
| 12,449,207 | B2 * | 10/2025 | Gerstler | F28D 7/1661 |
| 12,455,121 | B2 * | 10/2025 | Mayberry | F28D 20/021 |
| 12,474,122 | B2 * | 11/2025 | Kurosawa | B33Y 80/00 |
| 12,550,298 | B2 * | 2/2026 | Satoh | B33Y 80/00 |
| 2009/0321045 | A1 * | 12/2009 | Hernon | B22D 25/02<br>165/80.2 |
| 2014/0014493 | A1 * | 1/2014 | Ryan | B01D 53/185<br>203/49 |
| 2015/0007969 | A1 * | 1/2015 | Pal | F28F 3/12<br>29/890.03 |
| 2015/0299886 | A1 * | 10/2015 | Doubina | C25D 3/38<br>204/229.4 |
| 2018/0187984 | A1 * | 7/2018 | Manzo | F28F 13/12 |
| 2020/0033070 | A1 * | 1/2020 | Vlahinos | F28F 7/02 |
| 2020/0215480 | A1 * | 7/2020 | Roy | B01D 53/02 |
| 2020/0309469 | A1 * | 10/2020 | Maxwell | F28D 15/046 |
| 2021/0172567 | A1 * | 6/2021 | Kang | B21F 27/12 |
| 2021/0229350 | A1 * | 7/2021 | Chaffins | B29C 64/153 |
| 2022/0003503 | A1 * | 1/2022 | Iyer | B01D 53/0407 |
| 2022/0297369 | A1 * | 9/2022 | Benjamin | B29C 48/682 |
| 2023/0156969 | A1 * | 5/2023 | Satoh | B33Y 80/00 |
| 2025/0283670 | A1 * | 9/2025 | Park | F28F 7/02 |
| 2026/0009587 | A1 * | 1/2026 | Sheelavant | C25D 21/02 |

* cited by examiner

HIGH PERFORMANCE HEAT EXCHANGER

BACKGROUND

Electro-chemical deposition (ECD) systems can perform process steps for wafer level packaging (WLP) applications as well as copper (Cu) interconnect plating, cleaning and bevel etching, and anneal processing on wafer substrates. These systems conventionally include a heat exchanger for selectively cooling or heating plating chemistry to maintain a set point temperature for these processes. Conventionally, this heating is done with "spaghetti" tubing with an in-tank heater within the tank volume of the system, which is controlled by a valve, while the cooling is done with an inline Titanium (Ti) heat exchanger.

One application for which heat exchangers are used is electroplating. This is an advanced ECD process that requires a high plating current, which in turn increases the temperature of the plating chemistry fluid (or 'plating chemistry' for brevity and simplicity). Conventional Ti heat exchangers can result in Ti being dissolved into the plating chemistry at this high temperature, which contaminates the bath and may lead to wafer defects.

Further, hot water from the heater may enter inside heating coils and heat the plating chemistry fluid inside the tank. As conventional heater coils are very thin and small in diameter, conventional tubes within heating coils rupture frequently. This causes the intermixing of fluid (i.e., plating chemistry fluid and hot water) and dilutes the plating chemistry which can lead to wafer defects. Additionally, heater coils are difficult to clamp inside the tank and tubes are scattered inside the tank resulting in non-uniform heating of the chemistry.

Accordingly, high performance heat exchangers that eliminate or at least reduce Ti contamination during high temperature ECD processes are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, disclosed herein is a heat exchanger including a shell, and a gyroid structure comprising a first plurality of holes forming a first fluid path and a second plurality of holes forming a second fluid path, wherein the first fluid path and the second fluid path are mutually sealed off, wherein the first plurality of holes is configured to pass a coolant through the first fluid path of the heat exchanger, and wherein the second plurality of holes is configured to pass a plating chemistry fluid through the second fluid path of the heat exchanger.

In some embodiments, a material of the gyroid structure comprises Tungsten. In some embodiments, a material of the gyroid structure comprises Tantalum. In some embodiments, material of the gyroid structure comprises Zirconium.

In some embodiments, each hole of the first plurality of holes has a first diameter. In some embodiments, each hole of the second plurality of holes has a second diameter. In some embodiments, the second diameter is larger than the first diameter.

In some embodiments, the coolant passes through the first plurality of holes of the first fluid path from a coolant inlet to a coolant outlet. In some embodiments, the coolant inlet is disposed on one side of the shell, and wherein the coolant outlet is disposed on another side of the shell.

In some embodiments, the coolant inlet and the coolant outlet are disposed on a same side of the shell. In some embodiments, the coolant inlet and the coolant outlet are flush with the same side of the shell. In some embodiments, plating chemistry fluid passes through the second plurality of holes of the second fluid path from a plating inlet to a plating outlet. In some embodiments, the plating inlet is disposed on a top side of the shell, and wherein the plating outlet is disposed on a bottom side of the shell. In some embodiments, the plating inlet and the plating outlet are disposed at a same angle.

In some embodiments, the shell is cylindrical. In some embodiments, the shell is a rectangular prism.

In another aspect, disclosed herein is a method of exchanging heat in an electroplating apparatus with a heat exchanger, the heat exchanger including a shell, a gyroid structure comprising a material and including a first plurality of holes forming a first fluid path and a second plurality of holes forming a second fluid path, a coolant inlet, a coolant outlet, a plating inlet, and a plating outlet, wherein the first fluid path and the second fluid path are mutually sealed off, where one or more holes of the second plurality of holes disposed at the coolant inlet are blocked with the material, and where one or more holes of the first plurality of holes disposed at the plating inlet are blocked with the material, the method including exchanging heat between a coolant and a plating chemistry fluid by passing the coolant through the first plurality of holes of the first fluid path from the coolant inlet to the coolant outlet, and passing the plating chemistry fluid through the second plurality of holes of the second fluid path from the plating inlet to the plating outlet.

In some embodiments, the material is Tungsten. In some embodiments, the material is Tantalum. In some embodiments, the material is Zirconium.

In some embodiments, the shell and the gyroid structure are made of a same material in a common three-dimensional (3D) manufacturing operation.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Disclosed herein is a high-performance heat exchanger including a shell containing a gyroid structure. A gyroid is an infinitely connected triply periodic minimal surface, having a high surface area. In some embodiments, the gyroid structure includes a first plurality of holes forming a first fluid path and a second plurality of holes forming a second fluid path. In some embodiments, the first fluid path and the second fluid path are mutually exclusive to one another (i.e., sealed against each other). In this manner, a coolant is passed through the first fluid path and a plating chemistry is passed through the second fluid path. In this manner, the plating chemistry can be cooled.

Figure 1:
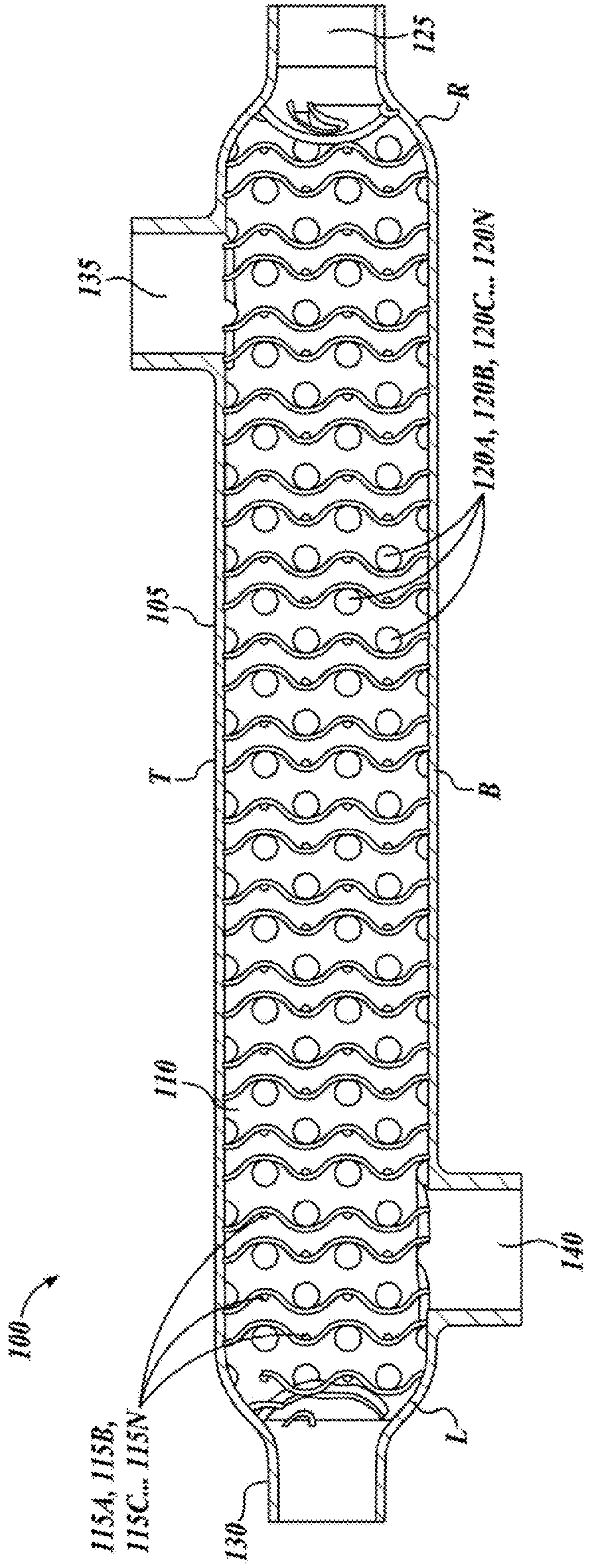
FIG. 1 is an example heat exchanger, in accordance with the present technology.

FIG. 1 is an example heat exchanger 100, in accordance with the present technology. In some embodiments, the heat exchanger 100 includes a shell 105 and a gyroid structure 110.

The gyroid structure 110, which is a shape having a triply periodic minimal surface (TPMS) features a high surface-to-volume ratio that results in highly efficient heat transfer. This gyroid structure allows for the heat exchanger 100 to be more compact than conventional Ti heat exchangers. A gyroid structure may be represented by Equation 1:

$$\sin x \cos y + \sin y \cos z + \sin z \cos x = 0 \qquad \text{Equation 1}$$

In some embodiments, the gyroid structure 110 is three-dimensionally (3D) printed. 3D printing allows for complex geometry, such as the gyroid structure 110 to be printed in a material such as Tungsten. In some embodiments, the gyroid structure 110 is made of Tungsten. Tungsten has a conductivity of 173 W/m K, which is 10 times that of Ti (having a conductivity of 17 W/m K). Tungsten also possesses a high chemical compatibility with high temperature plating chemistries. In some embodiments, the gyroid structure 110 is made of Tungsten, Tantalum, Zirconium, or a combination thereof. Tantalum and Zirconium are also chemically compatible with plating chemistries such as sulfuric acid and hydrochloric acids.

Figure 2:
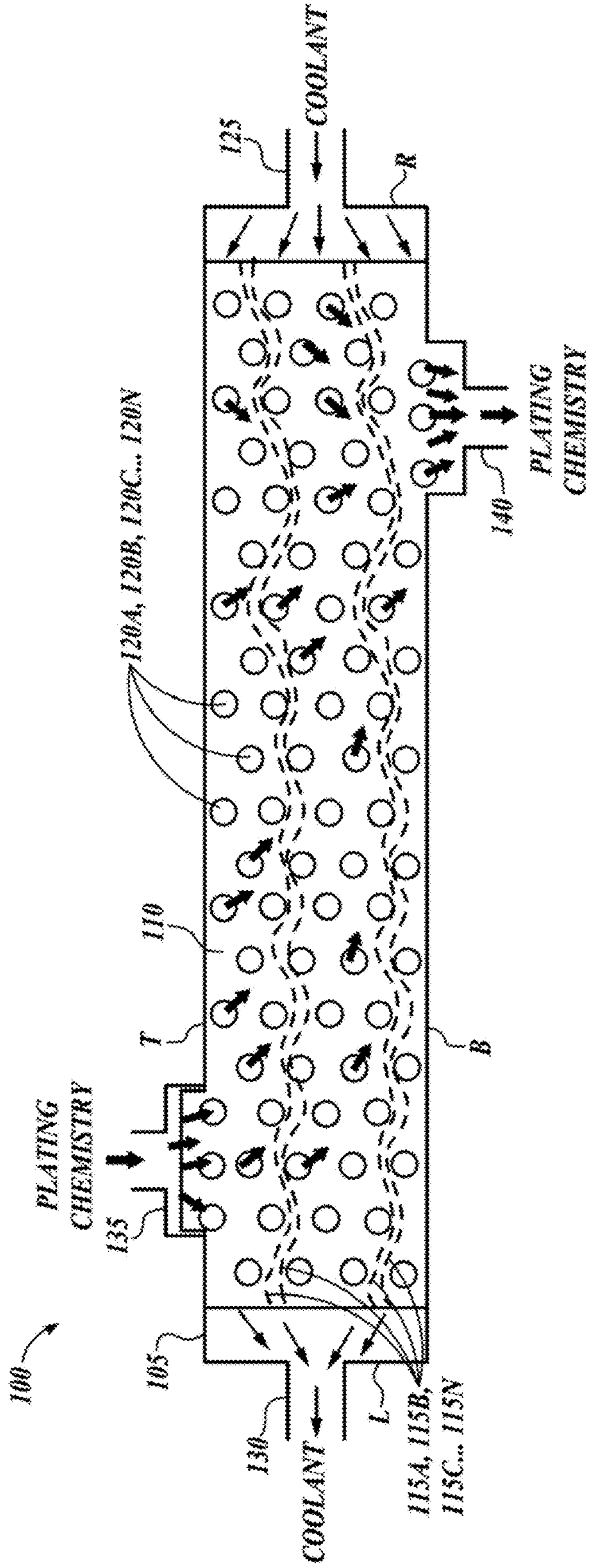
FIG. 2 is a simplified diagram of example flow paths of an example heat exchanger, in accordance with the present technology.

In some embodiments, the gyroid structure 110 has a first plurality of holes 115A, 115B, 115C . . . 115N and a second plurality of holes 120A, 120B, 120C . . . 120N. In some embodiments, the first plurality of holes 115A, 115B, 115C . . . 115N are mutually connected to form a first fluid pathway, and the second plurality of holes 120A, 120B, 120C . . . 120N are mutually connect to form a second fluid pathway, as shown in FIG. 2. In some embodiments, a coolant is passed through the first fluid pathway, and a plating chemistry fluid is passed through the second fluid pathway.

The shell 105 may include a top side T, a bottom side B opposite the top side T, a left side L, perpendicular to the top side T, and a right side R, opposite the left side L. In some embodiments, the shell further includes a coolant inlet 125, a coolant outlet 130, a plating inlet 135 and a plating outlet 140.

In some embodiments, the coolant inlet 125 is disposed on the right side R of the shell 105, while the coolant outlet 130 is disposed on a left side L of the shell 105. In such embodiments, a coolant passes through the first fluid pathway formed by the first plurality of holes 115A, 115B, 115C . . . 115N from left to right. In other embodiments, the coolant outlet 130 may be located on the right side R of the shell 105, while the coolant inlet 125 is located on the left side L of the shell 105. In some embodiments, the coolant inlet 125 and the coolant outlet 130 protrude from the shell 105, as shown in FIG. 1.

In some embodiments, the plating inlet 135 is located on the top side T of the shell 105, while the plating outlet 140 is located on the bottom side B of the shell 110. In such embodiments, the plating chemistry passes through the second fluid pathway formed by the second plurality of holes 120A, 120B, 120C . . . 120N from top to bottom.

FIG. 2 is a simplified diagram of example fluid pathways of an example heat exchanger 100, in accordance with the present technology. In some embodiments, the plating chemistry passes through a second fluid pathway through the second plurality of holes 120A, 120B, 120C . . . 120N, as shown by the unbroken arrows in FIG. 2. In some embodiments, the coolant passes through a first fluid pathway through the first plurality of holes 115A, 115B, 115C . . . 115N as shown by the dashed lines and arrows.

As shown, in some embodiments, the coolant flows from right (right side R) to left (left side L) from the coolant inlet 125 to the coolant outlet 130. In some embodiments, the plating chemistry flows from top (top side T) to bottom (bottom side B) from the plating inlet 135 to the plating outlet 140.

Figure 3B:
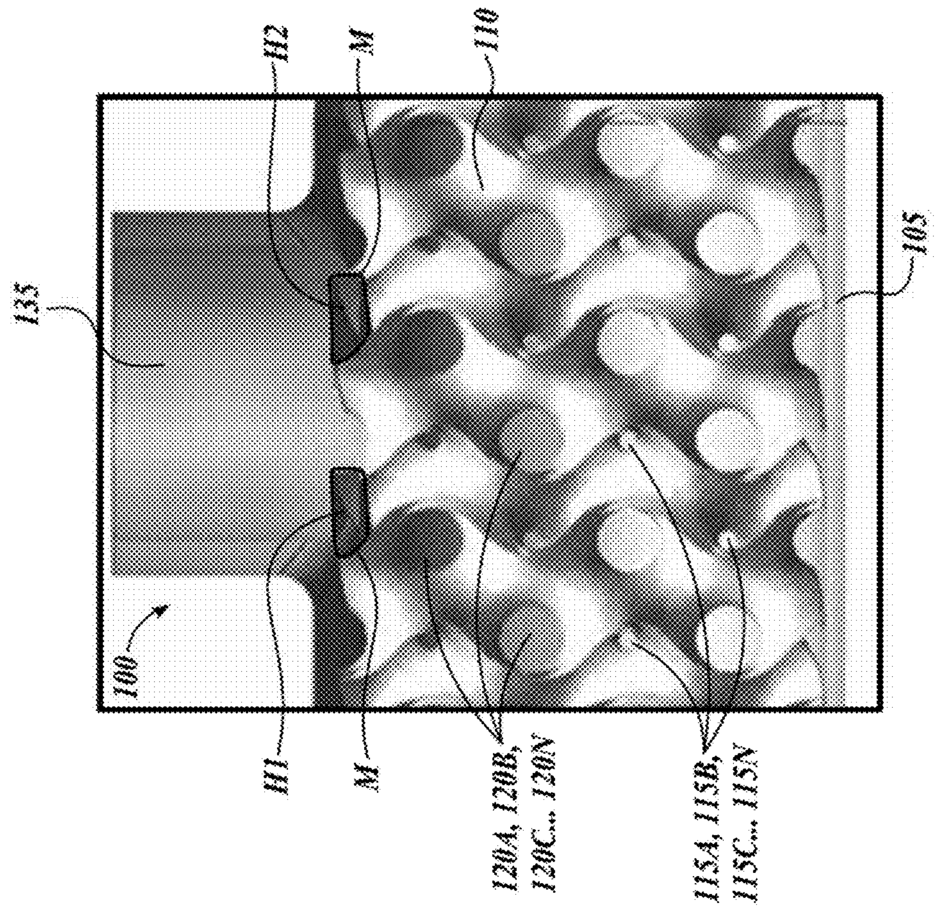
FIG. 3B is a closeup diagram of an example plating chemistry inlet, in accordance with the present technology.
Figure 3A:
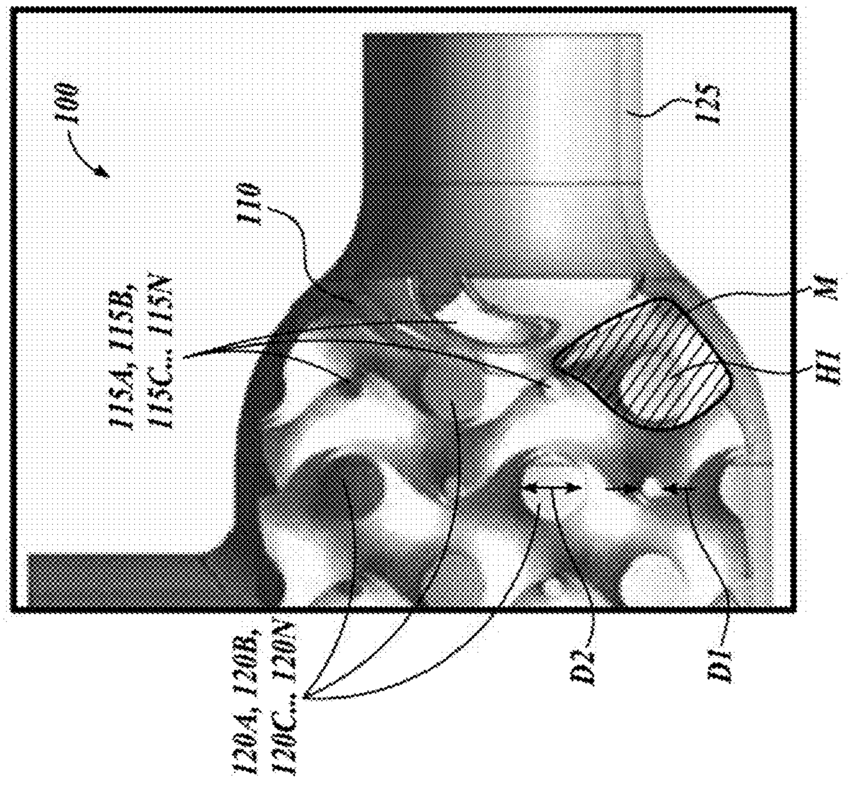
FIG. 3A is a closeup diagram of an example coolant inlet, in accordance with the present technology.

FIG. 3A is a closeup diagram of an example coolant inlet 125, in accordance with the present technology. In some embodiments, the coolant inlet 125 provides access to only the first plurality of holes 115A, 115B, 115C . . . 115N, and thus only the first fluid pathway. In some embodiments, the first fluid pathway and the second fluid pathway are mutually sealed off, that is, coolant in the first fluid pathway and plating chemistry in the second fluid pathway do not come into contact with one another, or otherwise contaminate the other fluid pathway.

In some embodiments, the first fluid pathway and the second fluid pathway are mutually sealed off with material M. In such embodiments, material M may seal the second fluid pathway at the coolant inlet 125 (i.e., by blocking one or more holes H1 of the second plurality of holes 120A, 120B, 120C . . . 120N). In some embodiments, material M is the same material as the one that makes up the shell 105. Accordingly, in some embodiments, the material M is Tungsten, Tantalum, Zirconium, or a combination thereof. In some embodiments, the material M is applied by three-dimensional (3D) printing.

FIG. 3B is a closeup diagram of an example plating inlet 135, in accordance with the present technology. In some embodiments, the plating inlet 135 provides access to only the second plurality of holes 120A, 120B, 120C . . . 120N, and thus only the second fluid pathway. The first fluid pathway that is defined by the first plurality of holes 115A, 115B, 115C . . . 115N and the second fluid pathway that is defined by the second plurality of holes 120A, 120B, 120C . . . 120N are mutually sealed off, that is, coolant in the first fluid pathway and plating chemistry in the second fluid pathway do not come into contact with one another, or otherwise contaminate the other fluid pathway.

In some embodiments, the first fluid pathway and the second fluid pathway are mutually sealed off with material M at least some of the holes 115 and 120. In such embodiments, material M may seal the first fluid pathway at the plating inlet 135 (i.e., by blocking one or more holes H1, H2 of the first plurality of holes 115A, 115B, 115C . . . 115N) In some embodiments, material M is the same material that makes up the shell 105. Accordingly, in some embodiments, the material M is Tungsten, Tantalum, Zirconium, or a combination thereof. In some embodiments, the shell 105 and the gyroid structure 110 can be 3D printed during a same (common) manufacturing process using a material such as Tungsten.

Figure 4A:
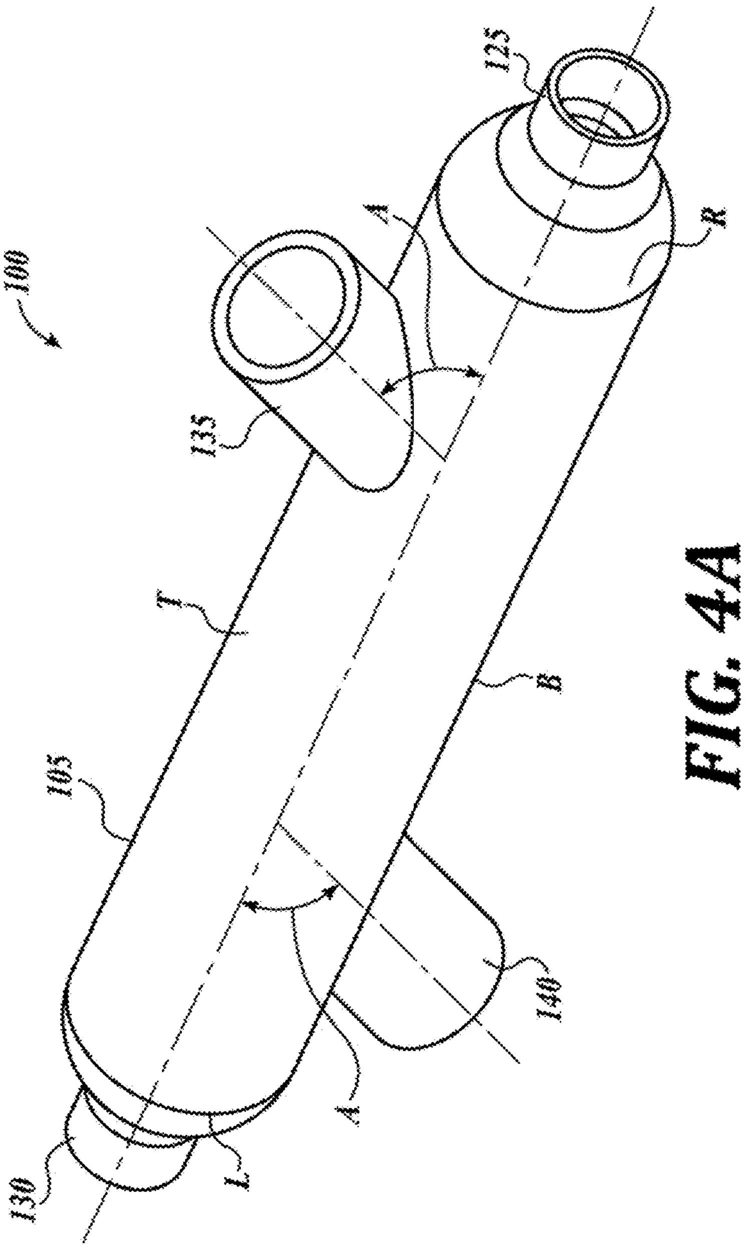
FIGS. 4A-4C are example heat exchangers, in accordance with the present technology.
Figure 4B:
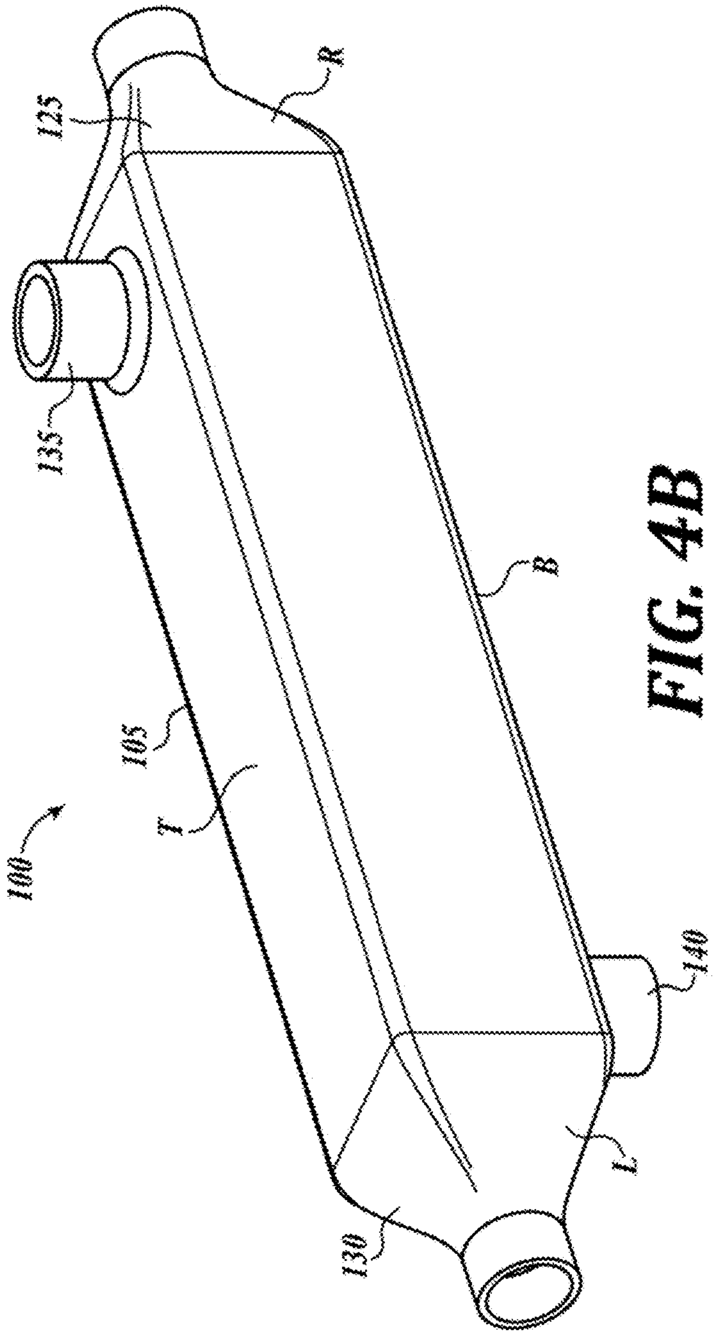
Figure 4C:
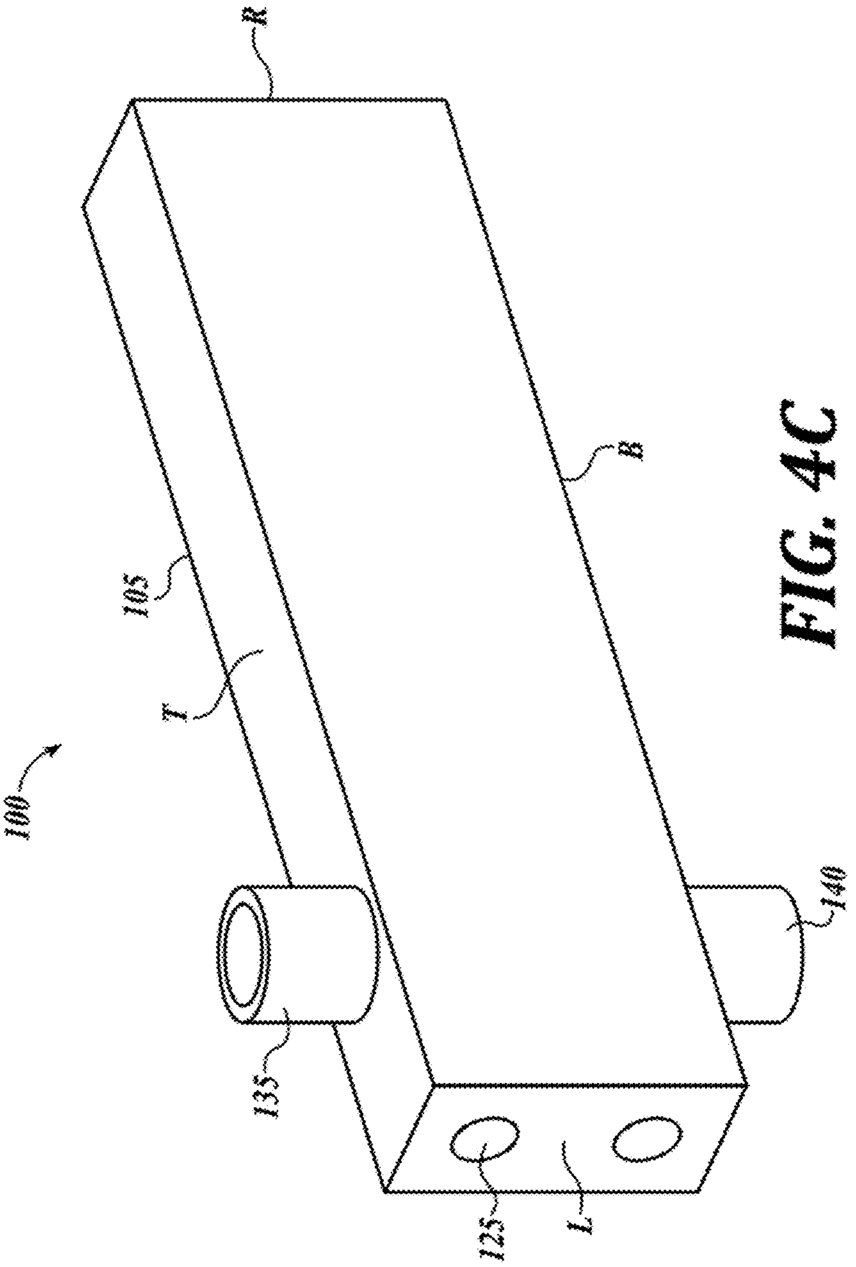

FIGS. 4A-4C are example heat exchangers 100, in accordance with the present technology. In some embodiments, the heat exchanger includes a shell 105, a top side T, a bottom side B, opposite the top side T, a left side L perpendicular to the top side T, and a right side R opposite the left side L. In some embodiments, the heat exchanger 100 includes a coolant inlet 125, a coolant outlet 130, a plating inlet 135, and a plating outlet 140.

In some embodiments, such as shown in FIG. 4A, the plating inlet 135 and the plating outlet 140 are disposed at a same angle A. In some embodiments, the plating inlet 135 and the plating outlet 140 are cylindrical. In some embodiments, the coolant inlet 125 and the coolant outlet 130 are located on opposite sides of the heat exchanger 100 (i.e., the right side R and the left side L, respectively). In some embodiments, the coolant inlet 125 and the coolant outlet 130 have a half-sphere-shaped base and are cylindrical.

FIG. 4B is an example heat exchanger 100 where the shell 105 is a rectangular prism. In some embodiments, the top side T, the bottom side B, the left side L and the right side R have substantially a same width. In some embodiments, the coolant inlet 125 and the coolant outlet 130 have a pyramid shaped base and are cylindrical.

FIG. 4C is an example heat exchanger 100 where the shell 105 is a rectangular prism. In some embodiments, the coolant inlet 125 and the coolant outlet 130 are disposed on a same side (the left side L, in FIG. 4C). In some embodiments, the coolant inlet 125 and the coolant outlet 130 are flush with the same side of the shell.

Figure 5:
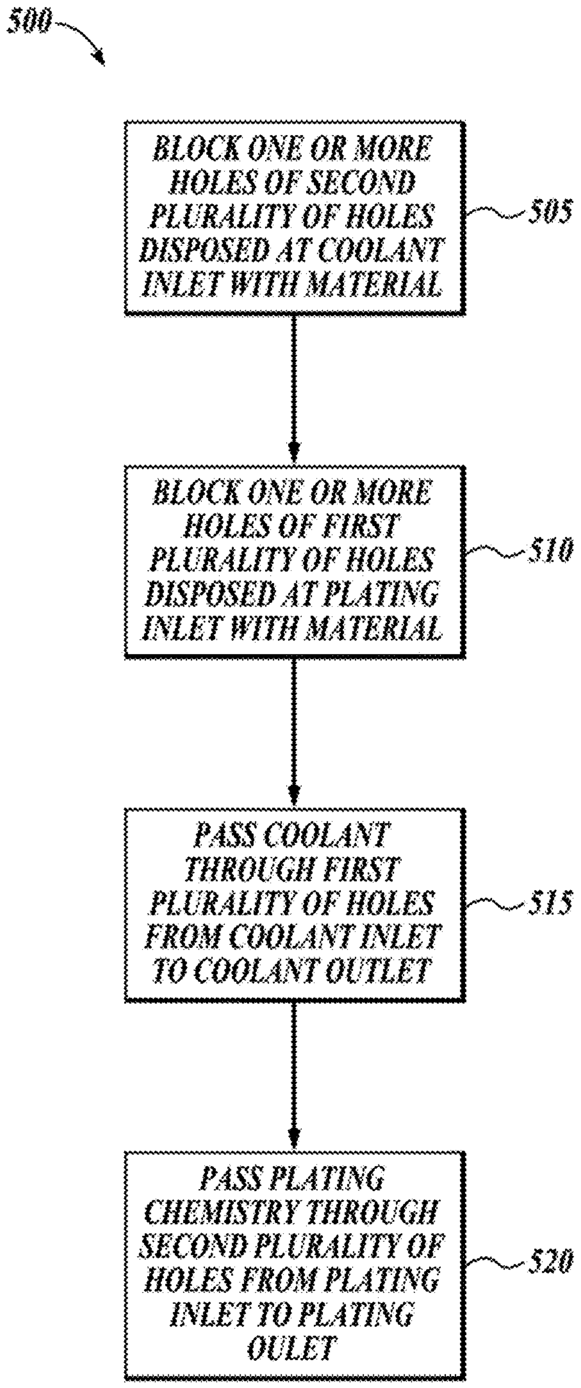
FIG. 5 is an example method of using a heat exchanger, in accordance with the present technology.

FIG. 5 is an example method 500 of using a heat exchanger (such as heat exchanger 100), in accordance with the present technology. In some embodiments, the method 500 is carried out by a heat exchanger having a shell (such as shell 105), a top side (such as top side T), a bottom side (such as bottom side B), opposite the top side, a left side (such as left side L) perpendicular to the top side, and a right side (such as right side R) opposite the left side. In some embodiments, the heat exchanger further includes a gyroid structure (such as gyroid structure 110) having a first plurality of holes (such as first plurality of holes 115A, 115B, 115C . . . 115N) forming a first fluid path (as shown in FIG. 2) and a second plurality of holes (such as second plurality of holes 120A, 120B, 120C . . . 120N), forming a second fluid path (as shown in FIG. 2) where the first fluid path and the second fluid path are mutually sealed off, where the first plurality of holes is configured to pass a coolant through the first fluid path of the heat exchanger, and where the second plurality of holes is configured to pass a plating chemistry fluid through the second fluid path of the heat exchanger. In some embodiments, the heat exchanger includes a coolant inlet (such as coolant inlet 125), a coolant outlet (such as coolant outlet 130), a plating inlet (such as plating inlet 135), and a plating outlet (such as plating outlet 140). In some embodiments, one or more holes (such as one or more holes H1) of the second plurality of holes disposed at the coolant inlet are blocked with a material (such as material M), and where one or more holes (such as one or more holes H1, H2) of the first plurality of holes disposed at the plating inlet are blocked with the material M.

In block 505, coolant is passed through the first plurality of holes from the coolant inlet to the coolant outlet. In some embodiments, the coolant is passed from the right side of the heat exchanger to the left side of the heat exchanger. In some embodiments, the material blocking the one or more holes of the second plurality of holes prevents the coolant from contaminating the plating chemistry.

In block 510, plating chemistry is passed through the second plurality of holes from the plating inlet to the plating outlet. In some embodiments, the plating chemistry is passed from the top side of the heat exchanger to the bottom side of the heat exchanger. In some embodiments, the material blocking the one or more holes of the first plurality of holes prevents the plating chemistry from contaminating the coolant.

In some embodiments, block 505 and block 510 happen simultaneously. In some embodiments, by passing the coolant and the plating chemistry through the first fluid channel and the second coolant channel, respectively, cools the plating chemistry to a temperature suitable for electroplating, thereby preventing the contamination of the bath and/or wafer defects as described herein. Further, if the shell of the heat exchanger comprises a material selected from Tungsten, Tantalum, Zirconium, or a combination thereof, Titanium dissolution can also be prevented.

It should be understood that method 500 should be interpreted as merely representative. In some embodiments, process blocks of method 500 may be performed simultaneously, sequentially, in a different order, or even omitted, without departing from the scope of this disclosure.

While illustrative embodiments have been illustrated and described, it will be appreciated that various changes can be made therein without departing from the spirit and scope of the invention.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

We claim:

1. A heat exchanger comprising:

a shell;

a gyroid structure formed of a material comprising a first plurality of holes forming a first fluid path and a second plurality of holes forming a second fluid path, wherein the first plurality of holes is configured to pass a coolant through the first fluid path of the heat exchanger, and wherein the second plurality of holes is configured to pass a plating chemistry fluid through the second fluid path of the heat exchanger; and one or more seals formed of the same material as the gyroid structure, wherein the one or more seals mutually seal off the first fluid path and the second fluid path by blocking one or more holes of the first plurality of holes to prevent contamination between the coolant and the plating chemistry fluid.

2. The heat exchanger of claim 1, wherein the material of the gyroid structure comprises Tungsten.

3. The heat exchanger of claim 1, wherein the material of the gyroid structure comprises Tantalum.

4. The heat exchanger of claim 1, wherein the material of the gyroid structure comprises Zirconium.

5. The heat exchanger of claim 1, wherein each hole of the first plurality of holes has a first diameter.

6. The heat exchanger of claim 5, wherein each hole of the second plurality of holes has a second diameter.

7. The heat exchanger of claim 6, wherein the second diameter is larger than the first diameter.

8. The heat exchanger of claim 1, wherein the coolant passes through the first plurality of holes of the first fluid path from a coolant inlet to a coolant outlet.

9. The heat exchanger of claim 8, wherein the coolant inlet is disposed on one side of the shell, and wherein the coolant outlet is disposed on another side of the shell.

10. The heat exchanger of claim 8, wherein the coolant inlet and the coolant outlet are disposed on a same side of the shell.

11. The heat exchanger of claim 10, wherein the coolant inlet and the coolant outlet are flush with the same side of the shell.

12. The heat exchanger of claim 1, wherein the plating chemistry fluid passes through the second plurality of holes of the second fluid path from a plating inlet to a plating outlet.

13. The heat exchanger of claim 12, wherein the plating inlet is disposed on a top side of the shell, and wherein the plating outlet is disposed on a bottom side of the shell.

14. The heat exchanger of claim 12, wherein the plating inlet and the plating outlet are disposed at a same angle.

15. The heat exchanger of claim 1, wherein the shell is cylindrical.

16. The heat exchanger of claim 1, wherein the shell is a rectangular prism.

* * * * *